United States Patent
Salamon

(10) Patent No.: US 6,403,919 B1
(45) Date of Patent: Jun. 11, 2002

(54) DISK MARKING SYSTEM

(75) Inventor: David V. Salamon, San Jose, CA (US)

(73) Assignee: Komag, Incorporated, San Jose, CA (US)

(*) Notice: Subject to any disclaimer, the term of this patent is extended or adjusted under 35 U.S.C. 154(b) by 0 days.

(21) Appl. No.: 09/259,987

(22) Filed: Mar. 1, 1999

(51) Int. Cl.[7] ............................................. B23K 26/00
(52) U.S. Cl. ................................................. 219/121.69
(58) Field of Search ....................... 219/121.65, 121.66, 219/121.68, 121.69, 121.85

(56) References Cited

U.S. PATENT DOCUMENTS

| | | | |
|---|---|---|---|
| 5,062,021 A | 10/1991 | Ranjan et al. | 360/135 |
| 5,595,768 A | 1/1997 | Treves et al. | 425/174.4 |
| 6,103,339 A | * 8/2000 | Lin et al. | |
| 6,108,169 A | * 8/2000 | Liu et al. | |

* cited by examiner

*Primary Examiner*—Samuel M. Heinrich
(74) *Attorney, Agent, or Firm*—Skyjerven Morrill MacPherson LLP; David E. Steuber

(57) ABSTRACT

A marking system is provided for thin film magnetic disks in which the laser texturing stage in the manufacturing process for magnetic disks is used to form a single track marking zone. In this marking zone, information about the disk is serialized and stored in the form of long and short laser features, representing bits in a binary code. The length of the marking zone can be used to indicate additional information about the disk.

23 Claims, 8 Drawing Sheets

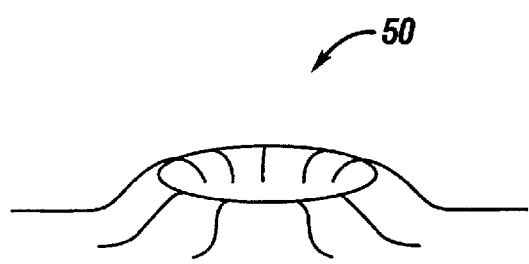
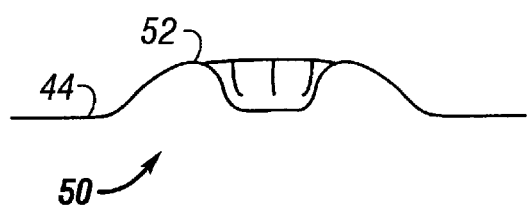
FIG. 4A  FIG. 4B
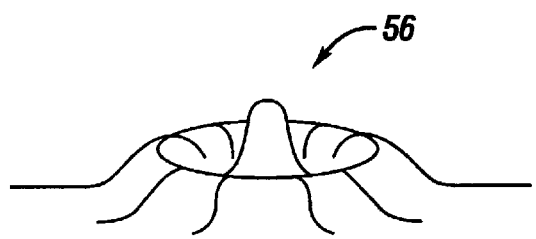
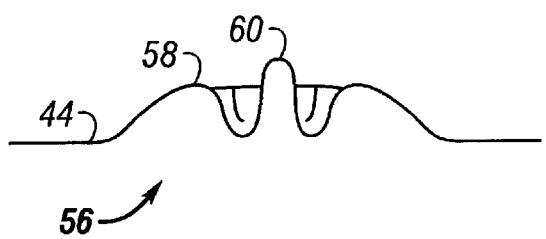
FIG. 5A  FIG. 5B

DISK MARKING SYSTEM

FIELD OF THE INVENTION

This invention relates to marking techniques used to mark thin film magnetic media.

BACKGROUND OF THE INVENTION

It is known in the magnetic disk manufacturing industry to provide manufacturing information about a particular product by printing the information on a surface of that product. This manufacturing information can include a product description, the lot number of that product, or the manufacturing facility where that product was produced, thereby enabling tracking or identification of the disk later in the manufacturing process or after shipment to the customer.

The manufacturing process of thin film magnetic disks, commonly used for storing data in computer hard drives, can be grouped into a series of primary steps. First, in the sizing and grinding step, a raw aluminum blank substrate is cut to proper dimensions and is ground to a desired flatness. Second, a nickel phosphorous (NiP) layer is formed atop the aluminum substrate. Third, the NiP layer is polished, textured, and cleaned. The disk is also laser textured. Fourth, in the sputter and lubrication ("lube") step, magnetic layers are deposited on the disk, covered by a protective overcoat, and a lubricant is applied. Finally, the completed disks are processed through a glide test and certification process.

FIG. 1 illustrates a cross-section of a finished magnetic disk 1 comprising an Al alloy substrate 2, a NiP alloy layer 3, a magnetic Co alloy layer 4, and a protective overcoat 5. A lubricating layer (not shown) is typically deposited onto the protective overcoat 5.

In the manufacturing of thin film magnetic disks, product marking has been accomplished by writing by hand the product information onto a portion of the surface of the disk. This crude method has several shortcomings. First, with the demand for increasing hard drive capacity, it is critical for manufacturers to be able to maximize the amount of surface area usable for storing data. A handwritten marking on a disk would render a substantial portion of the disk unusable for storing data, significantly reducing the value of that disk. Second, the manual step of writing on the disk is time-consuming and impractical for mass production of thin film disks. Thus, this method has been used primarily for marking experimental or test disks. Finally, the handling required for such a marking increases the likelihood of the disk being contaminated or damaged during the manufacturing process.

An alternative method for marking magnetic disks involves the use of a dedicated laser tool for printing alphanumeric characters on the surface of the disk. This marking step can be performed on a finished disk after the manufacturing process has been completed or on disks before the sputtering process. In either case, an additional step is added to the process, resulting in disadvantages similar to those described above. This method further requires the use of a specialized tool capable of laser-forming legible characters on the surface of the disk.

Alphanumeric laser marking has been accomplished by focusing a laser on the top surface of a finished or textured magnetic disk. The disk is held stationary, while a pulsed laser is positioned and focused to form visible deformations on the surface of the finished disk. The deformations are arranged such that they form visible alphanumeric characters. While this laser marking method may reduce the risk of damage or contamination of the disk by reducing the amount of manual handling of the disks required, it still necessitates the addition of another manufacturing step. In order for the characters to be legible, they must be made relatively large, thus reducing the amount of surface space available for storing data.

SUMMARY OF THE INVENTION

In accordance with the present invention, a method for marking a magnetic recording medium is provided. A marking zone is formed along a single track of a thin film disk using laser texturing. Product or manufacturing information is serialized on the surface of the disk in binary form, using long and short laser features to represent "ones" and "zeros".

In one embodiment, the marking zone is formed as a ingle track along a radial, or circumferential, portion of the disk adjacent to the contact start-stop one ("CSS zone"). The laser features in the marking zone are formed during the same process and manufacturing step as the laser zone texturing ("LZT") step for the CSS zone. This method enables marking of the disk without added tooling or manufacturing steps.

In another embodiment, the laser features in the marking zone are formed in an arc around a radial portion of the disk. A characteristic of the laser feature, such as the length of that arc, is visually identifiable and can be used as a simple method of quickly conveying information about the disk; longer arcs indicating, for example, one type of disk and shorter arcs indicating another.

BRIEF DESCRIPTION OF THE DRAWINGS

FIGS. 4A and 4B illustrate a laser feature.

FIGS. 5A and 5B illustrate an alternative form of laser feature.

The use of the same reference symbols in different drawings indicates similar or identical items.

DETAILED DESCRIPTION

In a conventional hard disk drive, a recording head "lands" and "takes-off" from a magnetic recording medium surface during the starting and stopping of the drive. When the medium spins at its normal operating rotational velocity, the recording head does not touch the medium, but instead "flies" on an air cushion between the head and the medium. For high recording performance and density, the recording head should be kept as low as possible while flying, which requires that the surface of the medium be as smooth as possible. However, if the medium is too smooth, stiction and friction between the head and the medium during starting and stopping of the drive will be excessive and may eventually result in a head crash. Thus, recording media manufacturers must provide some roughness on the media but not so much as to substantially increase the effective spacing between the magnetic film and the head.

Figure 1:
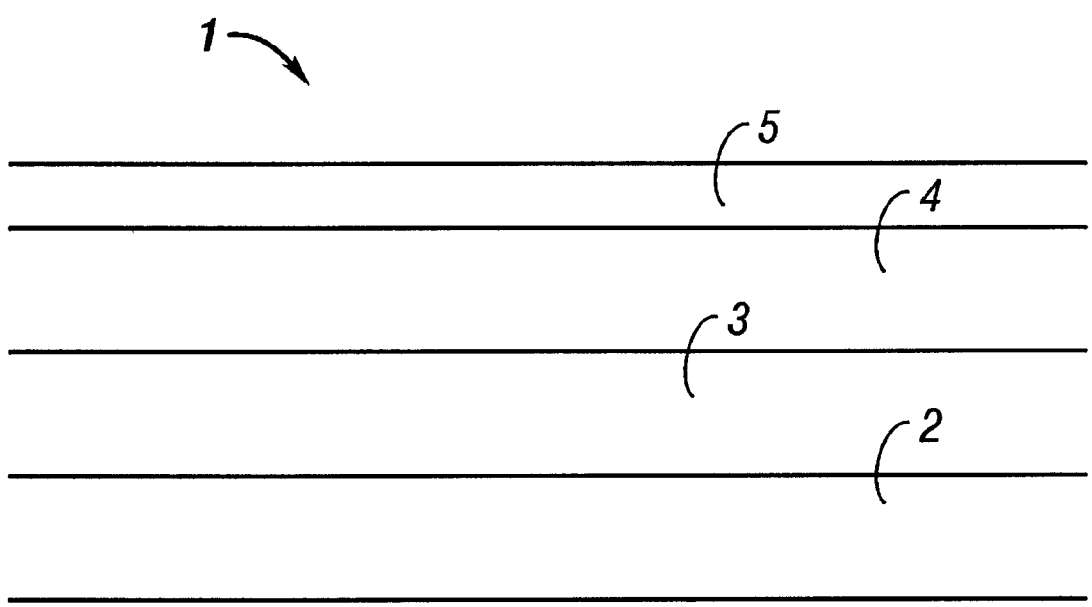
FIG. 1 illustrates a cross-section of a conventional thin film magnetic disk.
Figure 2:
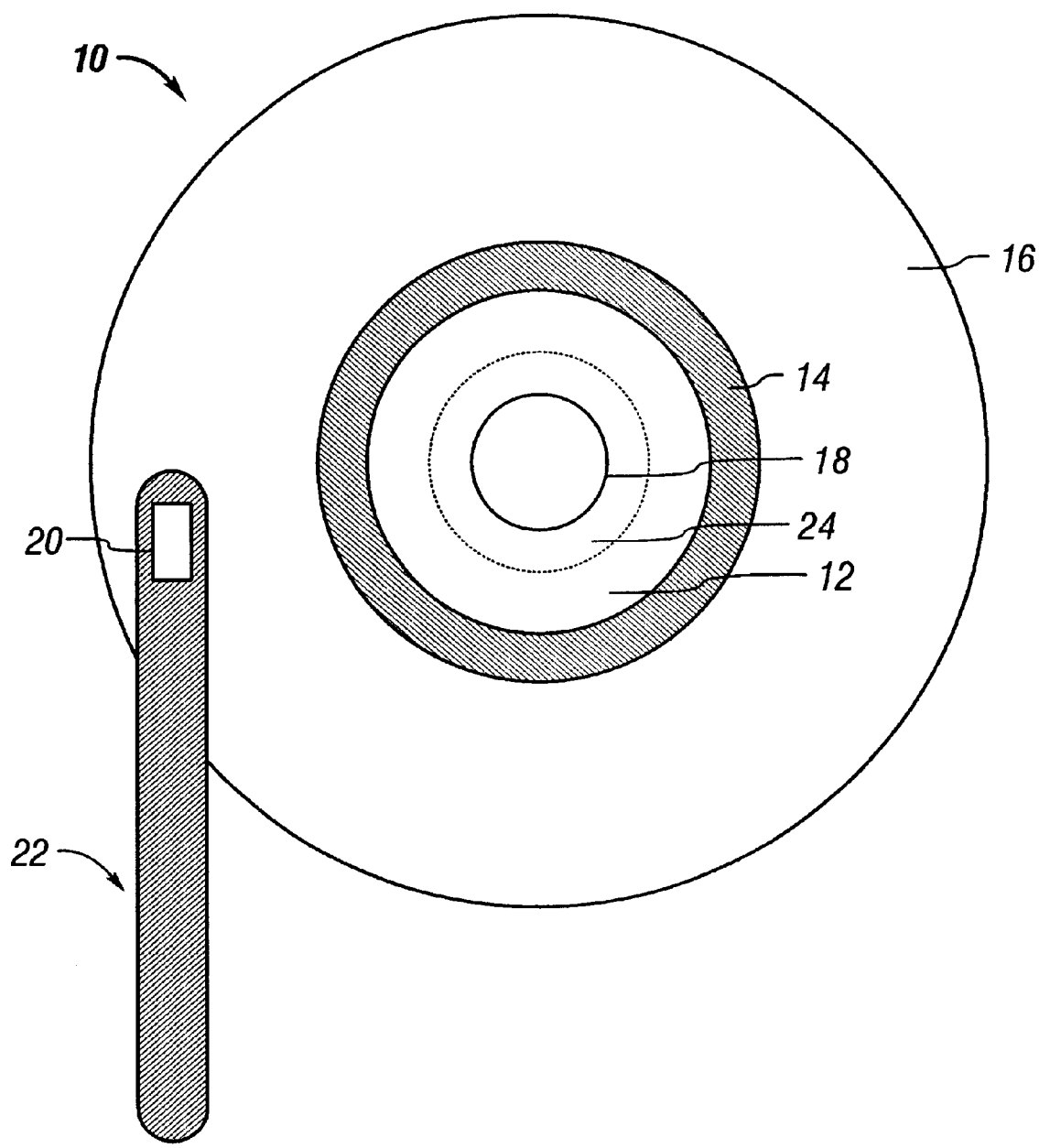
FIG. 2 illustrates a top view of a conventional thin film magnetic disk.

One current approach in the industry has been to zone texture the magnetic medium, as illustrated in FIG. 2. In this approach, the disk 10 includes three regions: an inner zone 12, a contact start-stop zone ("CSS zone") 14, and a data zone 16. The inner zone 12 is the region between the center opening 18 of the disk 10 and the CSS zone 14, and is typically the location where a clamp is applied to mount the disk in the hard drive. The clamp zone 24 is the portion of the disk 10 that is entirely covered by the clamp after the disk is mounted. The CSS zone 14 is the location where the read-write head 20 of the arm 22 takes off and lands. The width of the CSS zone 14 may vary depending on the application, and may be so wide as to overlap with the clamp zone 24. The data zone 16 is where data are magnetically recorded on the disk. A transition region may also be provided to allow a gradual decrease in roughness between the CSS zone 14 and the data zone 16.

The texturing on the CSS zone 14 may be performed using a variety of techniques. One conventional technique is laser texturing, which uses a pulsed laser light beam to form protrusions on the disk surface. Laser texturing techniques are described in U.S. Pat. Nos. 5,062,021 to Ranjan et al. and 5,595,768 to Treves, et al. Treves describes a process in which texturing is performed by generating a pulsed mode NdYAG (neodymium-doped yttrium aluminum garnet) laser selectively focused on the upper surface of the NiP layer on the disk substrate. The laser is periodically fired while the disk is being rotated. The intensity of the laser beam is provided at a sufficient level to locally melt a portion of that layer and/or sublayers. When the laser power is sufficiently attenuated, the melted region resolidifies, leaving a geometric variation (referred to herein as a laser feature) in the surface topography of the targeted layer or sublayers. The rotation of the disk during texturing results in spirals of laser-formed protrusions.

Figure 3:
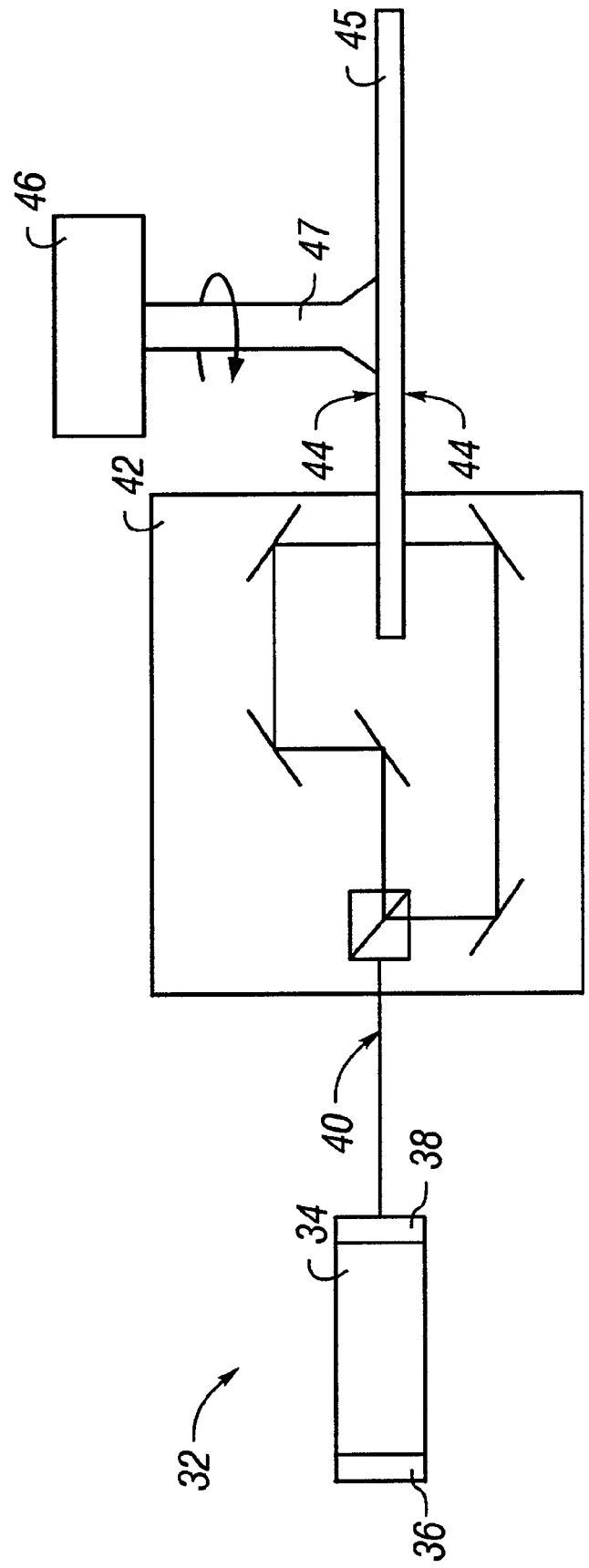
FIG. 3 is a schematic illustration of a laser texturing apparatus.

FIG. 3 is a schematic illustration of an apparatus 30 for creating laser features in a layer of a magnetic recording disk 45. Apparatus 30 consists of a pulsed laser 32, e.g., a Q-switched (pulsed) YAG laser, which consists of a laser cavity 34 bounded by a distal mirror 36 and a half-silvered proximal mirror 38. Laser 32 produces a coherent laser beam 40, which is directed toward focusing optics (lens or a combination of lenses and mirrors) 42.

Laser beam 40 is focused by focusing optics 42 to a spot on the top and bottom surfaces (referred to as the target surfaces 44) of a selected layer of magnetic disk 45, such as a plated NiP layer. Beam 40 is incident on the target surface 44 approximately normal to the plane of said surface 44 (i.e., within a few degrees of 90 degrees). Motor 46 causes magnetic disk 45, which is mounted to spindle 47, to rotate, so that as the laser 32 is pulsed, each pulse of the beam 40 may be made incident on a different circumferential region of target surface 44. In addition to rotation, optics 42 are translated in a lateral direction, roughly perpendicular to the path of the beam 40 so that the radial location of incidence of the laser beam 40 on the target surface 44 may be varied. Alternatively, the optics 42 may be stationary and the disk 45 can be translated to achieve the same effect; or, the entire assembly, laser 32 and optics 42, can be translated.

The incidence of the laser beam 40 on the target surface 44 generally forms one of two types of laser features, as determined by the parameters of the laser and material comprising the target surface 44. A first of these representative features is referred to a "crater", and is shown in FIG. 4A in perspective and FIG. 4B in cross-section. Crater 50 has a raised rim 52, which rises above the plane of target surface 44.

The second representative feature is referred to as a "sombrero", and is shown in FIG. 5A in perspective and FIG. 5B in cross-section. Sombrero 56 has a raised rim 58 as well as a central crown 60, which both generally rise above the plane of target surface 44.

Figure 6:
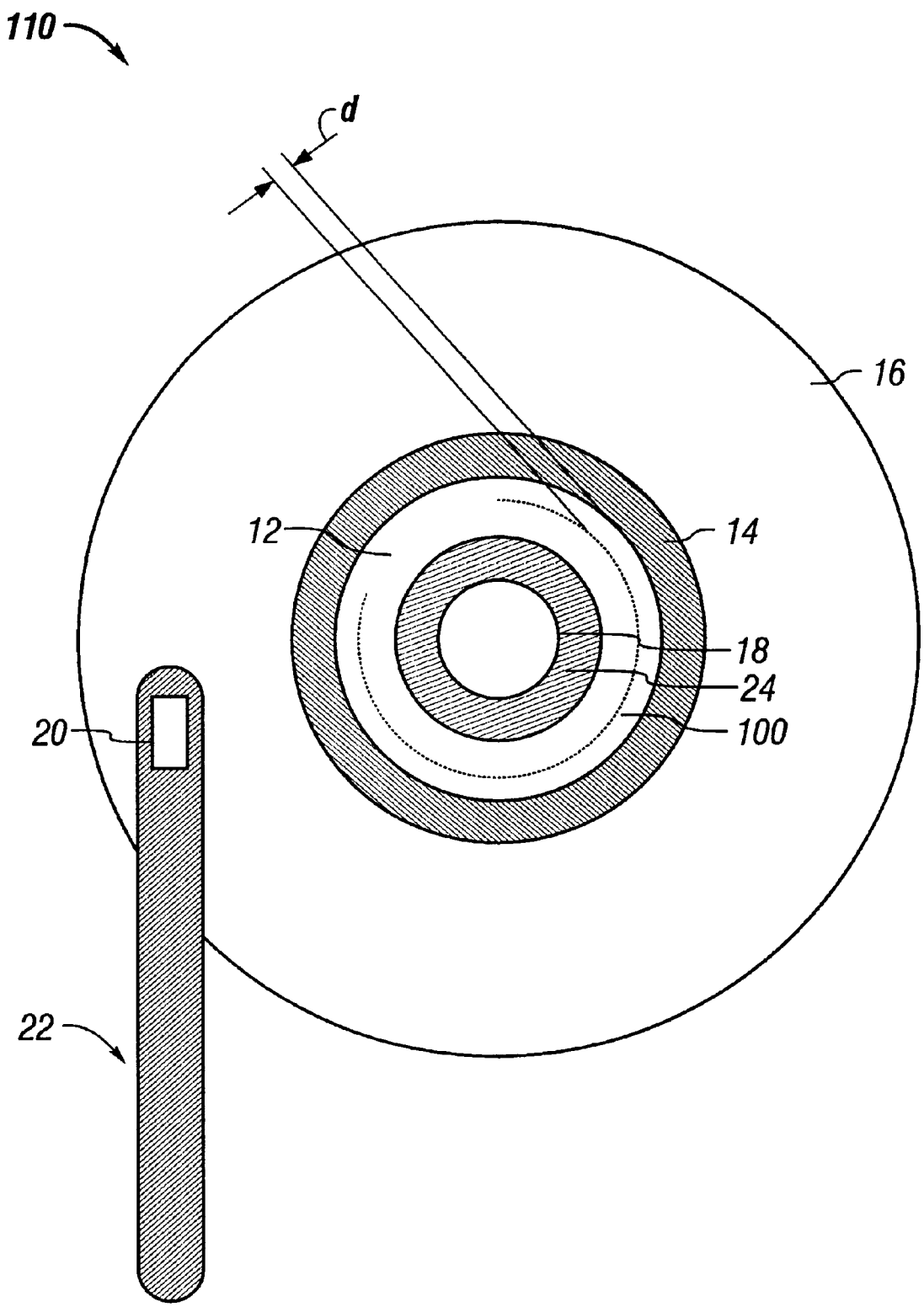
FIG. 6 illustrates a top view of a thin film magnetic disk in accordance with the present invention.

In accordance with one embodiment of the present invention, the laser used for laser zone texturing of the CSS zone is also used to form a marking zone 100 on a disk 110. FIG. 6 shows a disk 110 similar to the disk 10 shown in FIG. 2, but having a marking zone 100 formed in the inner zone 12 between the CSS zone 14 and the clamp zone 24. The marking zone 100 comprises a single track of laser features, substantially identical to the laser features forming the CSS zone 14.

The marking zone 100 is formed as follows. After the NiP alloy texture layer is deposited atop the Al substrate and polished to have a smooth surface, the disk 110 is loaded into an LZT machine for texturing. The LZT machine is shown schematically in FIG. 7 and is similar to the one illustrated in FIG. 3. The disk 110 is mounted onto a rotatable spindle 47, and optics 42 are positioned to focus laser beam 40 onto the NiP layer. The optics 42 are mounted onto a motorized slide (not shown), enabling the optics 42 to move in direction A laterally with respect to the disk 110.

The spindle 47 rotates the disk 110, and the optics 42 are positioned to focus the laser beam 40 at a radial distance corresponding to the desired location of the marking zone 100. While the disk 110 is rotating, the laser 32 is then pulsed at, for example, 110 KHz, with pulse widths of, e.g., 80 ns, and an average power of approximately 1 Watt, creating a single track of laser features. In one embodiment, the laser parameters for formation of the marking zone 100 are the same as the parameters used for the formation of the CSS zone 14. In another embodiment, the parameters are changed, thereby forming laser features different from the laser features which comprise the CSS zone 14. By varying the frequency of the laser pulsing and the disk rotation speed, the spacing and length of the laser features can be adjusted.

After the desired marking zone has been formed, the laser pulses are blocked momentarily to allow the optics 42 to be positioned to begin the formation of the CSS zone texturing. The CSS zone is typically formed by rotating the disk 110 at a constant rotational velocity while translating the optics 42 along the track in direction A at a constant linear velocity. Thus, the laser beam 40 moves radially outwardly while the disk 110 revolves about its central axis, forming a spiral arrangement of laser features on the surface of the disk 110. A similar function can be performed by translating the disk 110 and maintaining the optics 42 stationary.

Numerous other methods and variations for forming the CSS zone are possible, including the use of patterned zones or randomized texturing. The present invention may also be practiced using glass substrates, which do not include a NiP layer. In the case of glass substrates, the laser marks can be formed directly onto the surface of the substrate, or on any successive layers.

In order for the optics 42 to be accelerated to the desired constant linear velocity, the marking zone 100 and the CSS zone 14 should be separated by a minimum distance d.

While the laser 32 is pulsing to form the marking zone 100, the optics 42 undergo no translational movement. The optics 42 must then be accelerated to reach the prescribed linear velocity to form the desired pattern for the CSS zone 14. The minimum distance d is determined so as to provide sufficient room for that prescribed velocity to be attained and stabilized, and is affected by factors such as the acceleration speed of the optics 42 on the track and the rotational velocity of the spindle 47. In one embodiment, the minimum distance d is 119 μm. In an alternative embodiment, a distance d of 300 μm is sufficient to provide an adequate margin of safety for the optics 42 to reliably obtain the desired velocity.

Figure 7:
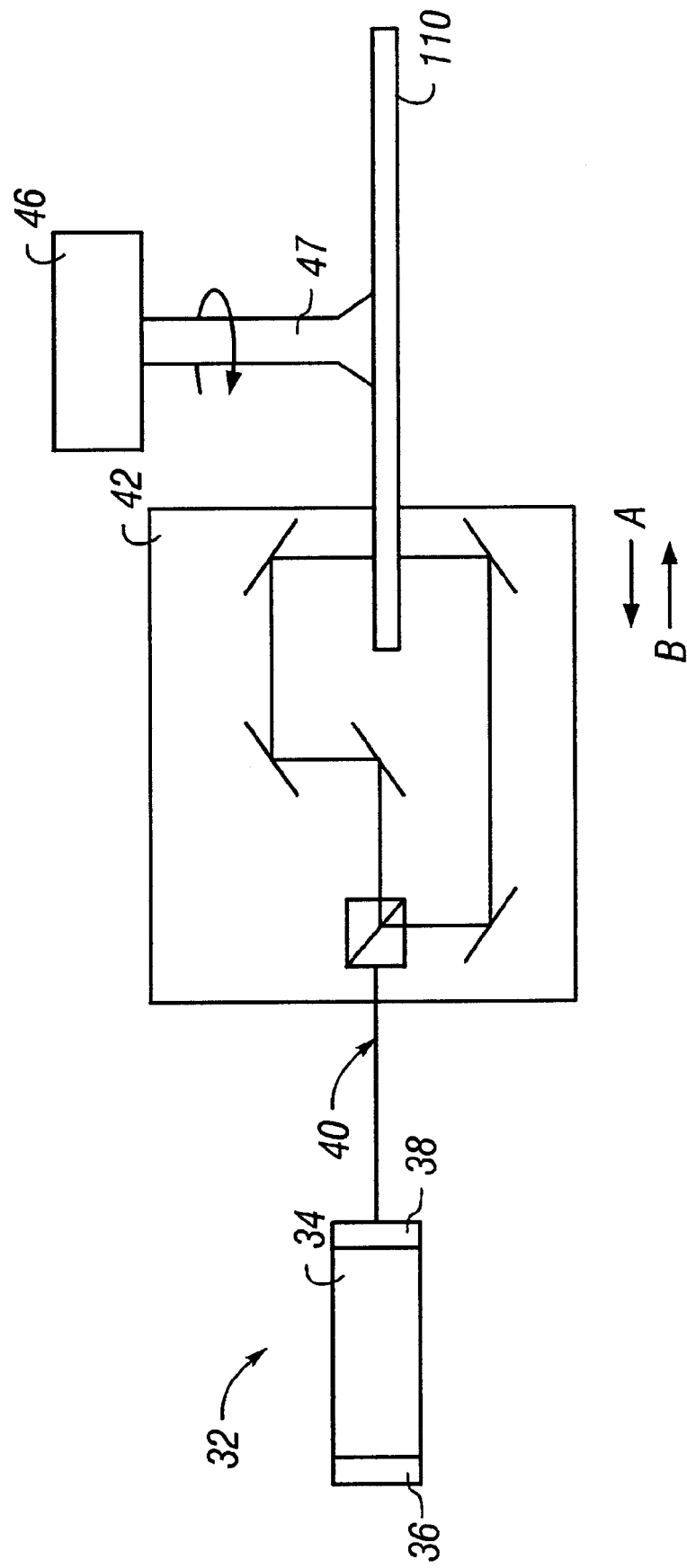
FIG. 7 is a schematic illustration of a laser texturing apparatus.

Alternatively, if it is desired to reduce the distance d to a distance smaller than that possible given the operating parameters, the optics 42, after completing formation of the marking zone 100, can be translated first in direction B, as shown in FIG. 7, to provide an increased distance in which the optics 42 can be brought up to the desired linear velocity.

Figure 8A:
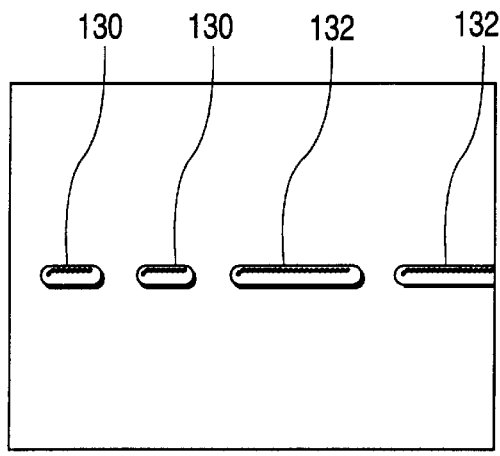
FIGS. 8A and 8B are magnified views of laser features in accordance with the present invention.
Figure 8B:
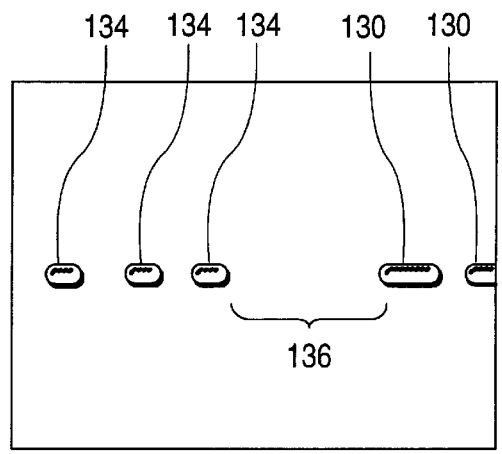
Figure 9A:
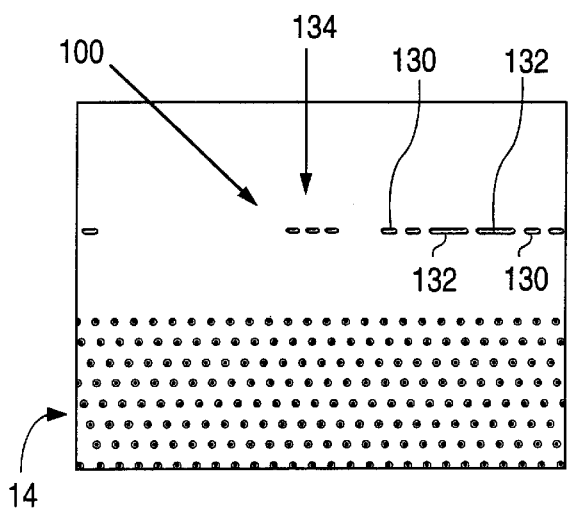
FIGS. 9A and 9B are magnified views of a marking zone and contact start-stop zone in accordance with the resent invention.
Figure 9B:
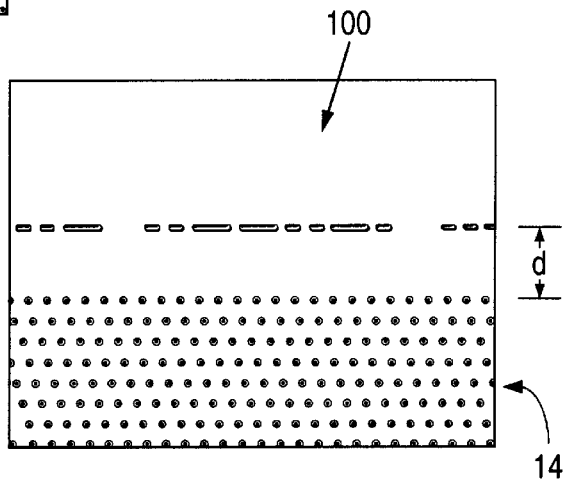

A magnified view of a marking zone according to one embodiment of the invention is shown in FIGS. 8A and 8B. Three types of laser features are shown in 20× objective in FIGS. 8A and 8B: short bumps 130, long bumps 132, and marker bumps 134. The length of each bump is determined by the duration of the laser pulse and the rotational velocity of the disk 110. FIGS. 9A and 9B show a 5× objective magnified view of the marking zone 100 and the CSS zone 14.

The sequence of laser features in the marking zone 100 can be used to indicate manufacturing or product information about the disk 110. This information may include, for example, production lot numbers or production facility information.

In one embodiment, the marking is applied to the disk 110 in the form of a serialization sequence in a binary code using standard 8-bit ASCII encoding. Each serialization sequence consists of a total of ten characters comprising both letters and numbers, and is repeated multiple times around the disk circumference with a long "code" spacing between repetitions. A serialization sequence will begin with three short "marker" bits 134 followed by a "byte" spacing 136 to indicate the beginning of the sequence. The "byte" spacing 136 is also used to separate each ASCII byte in the serialization sequence. FIGS. 8A and 8B show short "zero" bits 130 and long "one" bits 132 formed from extended melt regions. Exemplary lengths of the serialization laser features shown in FIGS. 8A and 8B and 9A and 9B are as follows:

| Coding Symbol | Length |
| --- | --- |
| "Zero" bit | 50 μm |
| "One" bit | 115 μm |
| "Marker" bit | 30 μm |
| Bit spacing | 30 μm |
| Byte spacing | 165 μm |
| Code spacing | 575 μm |

The "zero" and "one" bits can be indicated in various other ways. If short and long bits are used to indicate "zero" and "one", these bits may be formed in various lengths by forming a plurality of closely spaced or overlapping bumps, as opposed to the extended melt regions illustrated in FIGS. 8A and 8B. Alternatively, the "zero" may be indicated by a blank, unmarked space, and the "one" may be indicated by a laser mark. It will be understood that various adaptations of the serialization method are possible.

The serialization code can be read using a variety of methods. In one embodiment, the disk 110 is placed under a magnifying device, e.g., a microscope, and the individual bits in the serialization code are read by an operator and entered into a computer. The serialization code is then converted from binary code into alphanumeric text by a program running on the computer. Alternatively, the serialization code on the disk 110 can be read using a method similar to that used for reading conventional CD-ROMs. The disk 110 is placed on a spindle and a diode beam is projected onto the marking zone 100. The reflected light from the rotating disk 110 is monitored to identify the presence, length, and size of laser features in the marking zone 100. Again, these bits are converted by a computer into alphanumeric characters. Additionally, other known computerized vision systems may be employed to read the code of the present invention.

The digitally encoded information may not of itself provide any information about the disk, as is the case with a lot number. However, the lot number can be used to find detailed information about the lot that is typically stored in a separate computer system that may be at another location such as a disk manufacturing plant. Alternatively, or additionally, the digitally encoded information can of itself provide information about the disk. For example, the composition, thickness or other processing details of the layers, magnetic characteristics, or any other information can be encoded using a predetermined convention or code. A party knowing the code, such as the drive assembly plant, could read the encoded information to get the detailed information without having to look up the lot history.

The invention is not limited by the size, length, or shape of the laser features. The laser features may be formed in approximately the same size as the features in the CSS zone 14, or may be formed larger or smaller. Large features may be utilized to enable a person to read the serialization sequence without magnification, and smaller features may be utilized to enable more code to be placed on a smaller region. Larger codes may also be utilized when the marking zone 100 is located within clamp zone 24, because the larger codes are less likely to be destroyed by the pressure from the clamp. Similarly, the type of coding used for the marking zone 100 can be varied as well. Binary ASCII code may be chosen because it is a well known standard.

The location of the marking zone 100 on the surface of disk 110 can also be varied. The marking zone 100 can be formed within the clamp zone 24, making it unreadable after mounting in the hard drive. Alternatively, the marking zone 100 may be formed beyond an outer diameter of the CSS zone 14. In one embodiment, the marking zone 100 is located on a single radial track on the disk 110. In another embodiment, the marking zone 100 comprises a plurality of tracks.

Figure 10B:
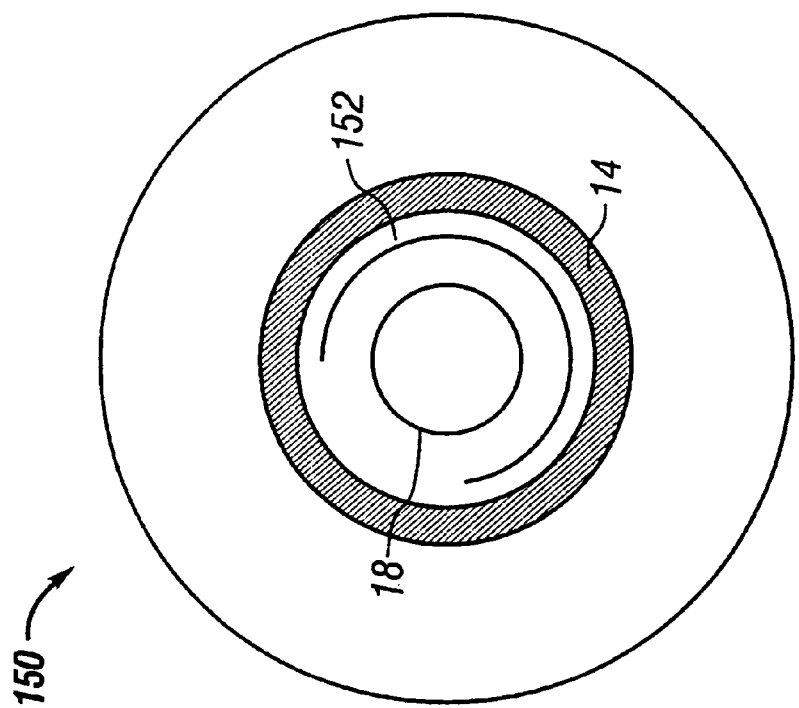
FIGS. 10A and 10B illustrate a top view of magnetic disks in accordance with another embodiment of the present invention.
Figure 10A:
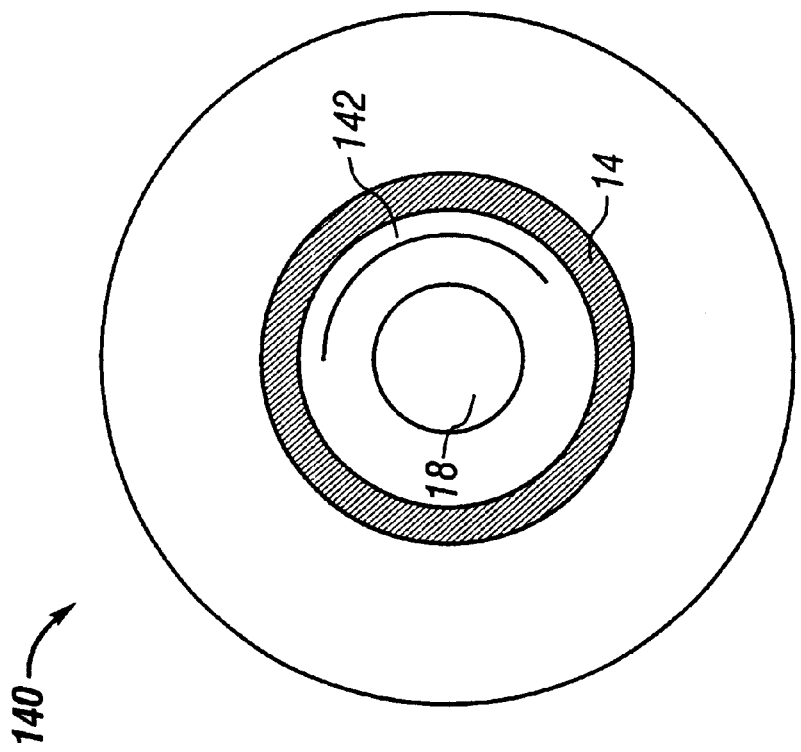

The marking system of the present invention provides an additional simplified method for conveying information about the disk being marked, as illustrated in FIGS. 10A and 10. FIG. 10A shows a disk 140 with a CSS zone 14 and short marking zone 142. FIG. 10B shows a disk 150 with a CSS zone 14 and long marking zone 152. The lengths of the marking zones 142 and 152 are determined by the number of times the serialization sequence is repeated in the marking zone or by the size of the laser features, and that length is used to convey information about the disks 140 and 150.

For example, a short marking zone 142 which extends in an arc of less than 180° can be used to indicate that the disk 140 was manufactured in Manufacturing Plant XYZ, while a long marking zone 152 which extends in an arc greater than 180° indicates that the disk 150 was produced in Manufacturing Plant ABC. In the embodiment shown, the laser features are formed large enough so that the length of the marking zone 100 can be seen with an unaided eye, making the origins of the disks 140 and 150 immediately determinable through a quick inspection of the disk surface. In another embodiment, the length of the marking zone 100 can be used to indicate a particular specification of the disk 100, e.g. radius or thickness.

With this embodiment, detailed lot and product information about the disk 100 can also be marked using the binary code serialization sequence described above, and adjustment of the number of repetitions of the serialization sequence or size of the laser features can be used to modify the length of the visible track of laser features, thereby conveying a different set of simplified information to the viewer. Alternatively, the simplified method of marking can be used alone, without incorporating the binary code method of serialization. In this case, unless other information is desired to be conveyed, the features may be of any size and sequence so long as they are formed in the desired length.

The simplified method of conveying information described above may be practiced in a variety of ways. The embodiment illustrated in FIGS. 10A and 10B comprise two states, i.e., two lengths of marking zones, long 152 and short 142. The marking system may also comprise three or more lengths of marking zones, corresponding to three or more different states.

Numerous types of characteristics of the features (such as the length of a segment) having a plurality of states (e.g., two or more different lengths) may be used in the practice of the present invention. In particular, in embodiments where it is desired to convey information in human readable form quickly and easily, any characteristic for which a plurality of different states may readily be discerned may be used. Further exemplary characteristics follow. It will be appreciated that many variants to the disclosed characteristics and different characteristics than those disclosed may be used in the practice of the present invention in accordance with the teachings herein.

Additional exemplary characteristics of the features that may be used include the width (dimension in the radial direction) of the feature and the shape of the feature (e.g. circular, elliptical, crater, sombrero). Visibly differing sequences of such characteristics may be used to increase the amount of information conveyed. For example, one state of a segment may be that it is made of only short features, another state may be that it is made of only long features, a third state may be alternating short and long features, and other states may be defined as various sequences of lengths, widths, or shapes which are easily discernible from one another.

A further characteristic may be the number of concentric segments, either within a single radius or at a plurality of radii. For example, the presence of features formed in a single circle or segment thereof (such as the embodiment shown in FIGS. 10A and 10B) may have one meaning, while the presence of more than one segment may have a second meaning. Moreover, each such segment can convey additional information using additional characteristics. For example, as in the earlier described embodiments, a first circle or segment may have digital information such as lot number encoded therein, and may be of a first or a second length (by varying number of repetitions, for example) to indicate a first or second manufacturing plant. The presence or absence of a second circle or segment may indicate manufacturing information such as the presence (or absence) of a layer (such as protective overcoat). The second segment may convey additional information beyond what is conveyed by its presence. In the foregoing example, information about the layer such as its thickness may be conveyed by, e.g., the length of the second segment and further information about the composition of the layer may be conveyed by, e.g., the shape of the features forming the second segment. The second segment may also contain digitally encoded information if desired.

The marking system of the present invention provides several advantages. Because the marking zone 100 is formed during the same manufacturing step as the CSS zone 114, very little additional cost is incurred to add the marking to the disk. No additional tooling is required and there is a decreased chance for contamination or damage because no additional marking step is needed. Furthermore, because the marking zone 100 is formed as a single track of laser features on the disk 110, the marking takes up only a very small portion of the available surface area. Even if the marking zone 100 is formed as a plurality of tracks, the zone 100 still takes up significantly less surface area than the alphanumeric laser printed characters previously used. The marking zone 100 may also be formed in an inner radial portion of the disk 110 which would otherwise remain unused, thereby leaving the data storage zone 16 unaffected.

Moreover, embodiments of the present invention that convey information in easily human readable form can be used in manufacturing to ensure correct processing or assembly, during failure analysis, etc., or wherever human knowledge of such information and/or action based on such information is desirable.

A further advantage of the present invention is that several types of information can be conveyed about disk at once. A serialization sequence forming the marking zone can be used to store a first set of information in binary form, while the length of the marking zone can indicate a second set of information using a simplified form. And, while an advantage of some embodiments of the present invention includes characteristics that are human readable, such characteristics, like the binary code, can be read and decoded by machine, if desired.

Although the invention has been described with reference to particular embodiments, the description is only an example of the invention's application and should not be taken as a limitation. Various adaptations and combinations of the features of the embodiments disclosed are within the scope of the invention as defined by the following claims.

What is claimed is:

1. A method for marking a magnetic recording medium, comprising:
   providing a substrate;
   texturing a surface of said substrate with a laser texturing tool so as to form texture features in a contact start-stop zone; and
   using said laser texturing tool to form information features on said surface of said substrate, said information features representing information about said magnetic recording medium.

2. The method of claim 1 wherein said substrate comprises an aluminum alloy.

3. The method of claim 1 wherein said information features are located closer to a center of said substrate than said contact start-stop zone.

4. The method of claim 1 wherein said information features have different lengths.

5. The method of claim 1 wherein using said laser texturing tool to form information features comprises forming at least a first group of information features having a first length and a second group of information features having a second length, wherein the placement of the individual information features in said first and second groups of information features represents said information.

6. The method of claim 5 wherein using said laser texturing tool to form information features comprises forming a third group of information features having a third length.

7. The method of claim 5 wherein said information features represent bits of a binary code, said binary code representing said information.

8. The method of claim 7 wherein said binary code uses 8-bit ASCII encoding.

9. The method of claim 5 wherein one of said first and second groups represents a binary one and the other of said first and second groups represents a binary zero.

10. The method of claim 1 where said information features are separated by spacings, said spacings having different lengths.

11. The method of claim 1 wherein said substrate comprises a base material and a stack of one or more layers, said stack having a top surface and a bottom surface, said bottom surface being in contact with said base material, said texturing being performed and said information features being formed on said top surface.

12. The method of claim 1 comprising:
rotating said substrate;
wherein said texturing comprises:
focusing a laser at a first radial location of said substrate; and
pulsing said laser to form said contact start-stop zone; and
wherein using said laser texturing tool to form information features comprises:
focusing said laser at a second radial location of said substrate; and
pulsing said laser to form said information features.

13. The method of claim 1 wherein said laser texturing tool comprises a neodymium-doped yttrium aluminum garnet laser.

14. The method of claim 1 wherein said texture features are in the form of craters.

15. The method of claim 1 wherein said texture features are in the form of sombreros.

16. The method of claim 1 wherein said texturing comprises forming a spiral pattern of texture features.

17. The method of claim 1 wherein said texturing comprises forming a random arrangement of craters or a random arrangement of sombreros.

18. The method of claim 1 wherein said substrate comprises glass.

19. The method of claim 1 wherein said information comprises a production lot number.

20. The method of claim 1 wherein said information comprises the composition, thickness or magnetic characteristics of a layer within said substrate.

21. The method of claim 1 wherein said information features are a different size from texture features.

22. The method of claim 1 wherein said information is represented by the width of said information features in a radial direction.

23. The method of claim 1 wherein said information is represented by the shape of the information features.

* * * * *